(12) United States Patent
Friend

(45) Date of Patent: Feb. 7, 2006
(10) Patent No.: US 6,995,749 B2

(54) AUTO FONT MAGNIFICATION MECHANISM

(75) Inventor: John Friend, Los Altos, CA (US)

(73) Assignee: Good Technology, Inc., Sunnyvale, CA (US)

( * ) Notice: Subject to any disclaimer, the term of this patent is extended or adjusted under 35 U.S.C. 154(b) by 340 days.

(21) Appl. No.: 10/401,487

(22) Filed: Mar. 28, 2003

(65) Prior Publication Data

US 2004/0189610 A1 Sep. 30, 2004

(51) Int. Cl.
*G09G 5/00* (2006.01)

(52) U.S. Cl. .................... 345/169; 345/472.2

(58) Field of Classification Search .............. 345/169, 345/472.2, 671, 102; 715/800
See application file for complete search history.

(56) References Cited

U.S. PATENT DOCUMENTS 5,239,295 A * 8/1993 DeLuca et al. ............. 340/7.4
5,575,556 A * 11/1996 Kennedy ..................... 362/109
2002/0158883 A1 * 10/2002 Cheri et al. ................. 345/589

OTHER PUBLICATIONS

MobileMag.com; "Good Technology G100 Wireless Handheld"; http://www.mobilemag.com/content/100/333/C1093/.*

* cited by examiner

*Primary Examiner*—Jinny H. Nguyen
*Assistant Examiner*—Steven E. Horn
(74) *Attorney, Agent, or Firm*—Blakely Sokoloff Taylor & Zafman, LLP

(57) ABSTRACT

According to one embodiment, a handheld device is disclosed. The handheld device includes a housing, a display mounted within the housing, and a font magnification mechanism. The font magnification mechanism automatically magnifies a font being displayed on the display to a larger font whenever the handheld device is operating in dim lighting conditions.

13 Claims, 4 Drawing Sheets

AUTO FONT MAGNIFICATION MECHANISM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates generally to the field of wireless data systems. More particularly, the invention relates to an improved user interface for a wireless device.

BACKGROUND

A variety of wireless data processing devices have been introduced over the past several years. These include wireless personal digital assistants ("PDAs") such as the Palm® VIIx handheld, cellular phones equipped with data processing capabilities, and, more recently, corporate wireless messaging devices such as the Blackberry™ wireless pager developed by Research In Motion ("RIM").™

With advances in silicon processing technology, data processing devices and cellular phones continue to decrease in size. Smaller size, however, creates new challenges related to usability. For example, as data processing devices get smaller, the amount of space available on the device available for data input decreases. As such, it may be necessary to reduce the amount of input required from a user to perform tasks on the data processing device. An additional challenge is that smaller data processing devices typically require smaller displays that implement small fonts, which may be difficult for a user to read.

Accordingly, what is needed is a font magnification mechanism.

SUMMARY

According to one embodiment, a handheld device is disclosed. The handheld device includes a housing, a display mounted within the housing, and a font magnification mechanism. The font magnification mechanism automatically magnifies a font being displayed on the display to a larger font whenever the handheld device is operating in dim lighting conditions.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
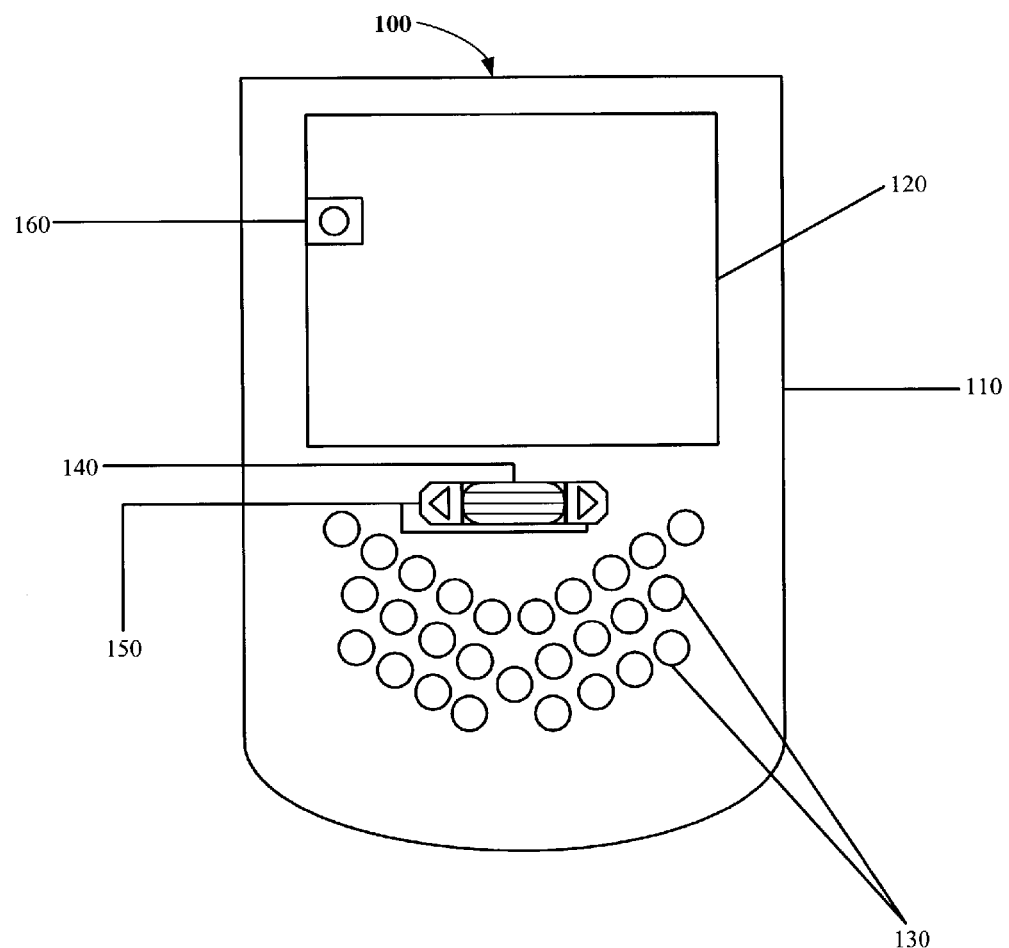
FIG. 1 illustrates one embodiment of a data processing apparatus on which features of the invention are implemented.

FIG. 1 illustrates a handheld data processing device 100 for implementing embodiments of the invention. In one embodiment, the data processing device 100 is a wireless messaging device which maintains complete synchronization with a user's email, electronic calendar, contacts, tasks and notes (and/or any other type of user information) when the user is out of the office. However, the data processing device 100 may serve various other functions while still complying with the underlying principles of the invention (e.g., the device may be a standard personal digital assistant ("PDA") or cellular phone with data processing capabilities).

As illustrated, the data processing device 100 includes a housing 110, display 120, keyboard 130, thumbwheel 140, navigation buttons 150, and light sensor 160. The housing 110 encloses a printed circuit board that includes various electronic components mounted thereon including, for example, a volatile memory (e.g., RAM) and/or a non-volatile memory (e.g., ROM, Flash memory, . . . etc) and a processor for processing data and program code. In one embodiment, housing 110 is an elongated structure that fits in the palm of a user. The display 120 is mounted within the housing 110 and includes an image projecting mechanism that generates text and graphic images as described in detail below.

In one embodiment, the display 120 is implemented with a liquid crystal display ("LCD"). In yet a further embodiment, the LCD is a reflective-transmissive LCD (e.g., 30% transmissive and 70% reflective). However, one of ordinary skill in the art will appreciate that the underlying principles of the invention are not limited to any particular display type.

In a further embodiment, display 120 has a back lighting (not shown) that enables a user of handheld device 100 to view display 120 in dark or dim lighting. Light sensor 160 is mounted within housing 110 underneath display 120. Light sensor 160 senses light beams through the transmissive portions of display 120. In one embodiment, light sensor 160 is mounted below display 120 in such a manner that no visible opening may be seen through display 120.

The keyboard 130 mounted on the housing 110, is the primary text input device. In one embodiment, the keyboard includes a standard arrangement of alphabetic keys (e.g., the "QWERTY" keyboard). Also, in one embodiment, the keyboard 130 includes standard function keys, such as an Escape key, a tab key, shift and/or control keys. As illustrated, in one embodiment, the keyboard 130 has an upward slant, center spine configuration.

The upward slant configuration enables a user to easily access all of the keys on keyboard 130 with minimal hand movement. For example, a user may easily make a transition from a key in the middle of keyboard 130 (e.g., the Y key) to a key on the outside of keyboard 130 (e.g., the P key) with natural thumb movement. In addition, the backlighting also illuminated keyboard 130 so that a user of handheld device 100 to view the keys of keyboard 130 in dark or dim lighting.

In one embodiment, the thumbwheel 140 and navigation buttons 150 provide a cursor control mechanism, allowing a user to scroll up and down and select information from a graphical user interface ("GUI") generated on the display 120. In a further embodiment, the thumbwheel 140 may be depressed and released as a button.

In one embodiment, simply clicking and releasing the thumbwheel performs a first type of function (e.g., like a Windows left mouse click) whereas clicking and holding the thumbwheel performs a second type of function (e.g., like a Windows right button mouse click). For example, clicking the thumbwheel may open an item or activate a widget whereas holding the thumbwheel may bring up a menu of commands (e.g., context and/or application-level commands). Incorporating two functions in a single selection element provides for a more efficient use of the selection element and is particularly beneficial on a small device with a small display screen.

Figure 2:
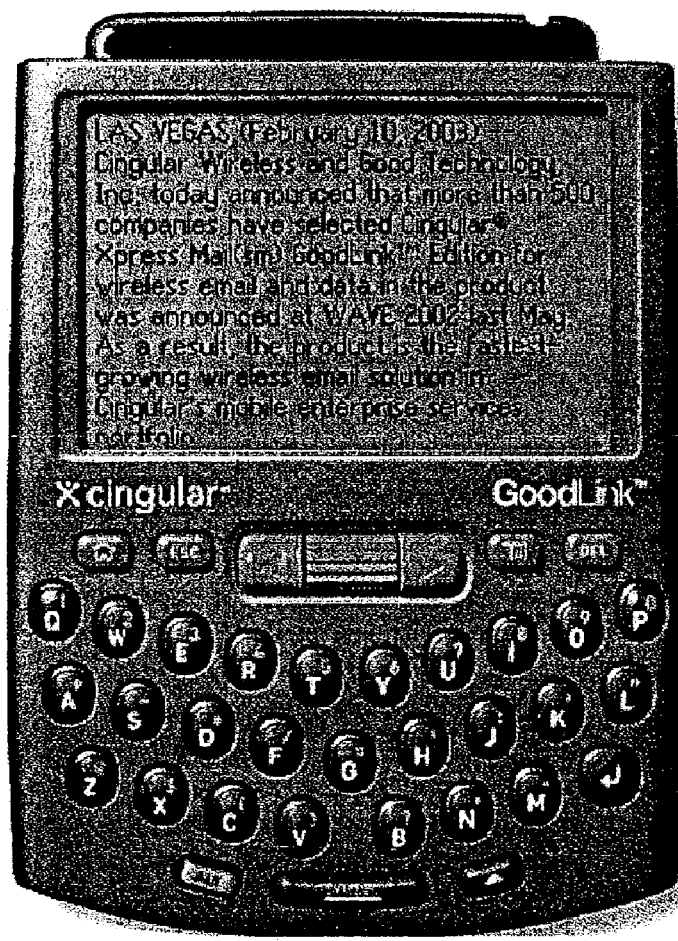
FIG. 2 illustrates another embodiment of a data processing apparatus on which features of the invention are implemented.

FIG. 2 illustrates another embodiment of handheld data processing device 100. In this embodiment, text is displayed on display 120. As shown in FIG. 2, the font presented on display 120 in this embodiment is relatively small. The ability of a user to read such a small font when operating handheld device 120 in dark conditions is exacerbated. Thus, a backlight, as described above, is implemented to light up display 120.

However, the backlight on typical handheld devices is fairly ineffective. For users that have marginal close-up vision, the combination of darkness, the backlight and reduced near-sighted vision makes it so that the display continues to be unreadable, notwithstanding the backlight being activated. This is caused by the fact that in low light conditions, the pupil of the eye has to open to enable more light to enter. However when the pupil opens, the ability to focus on small letters of text on the display is reduced.

Figure 3:
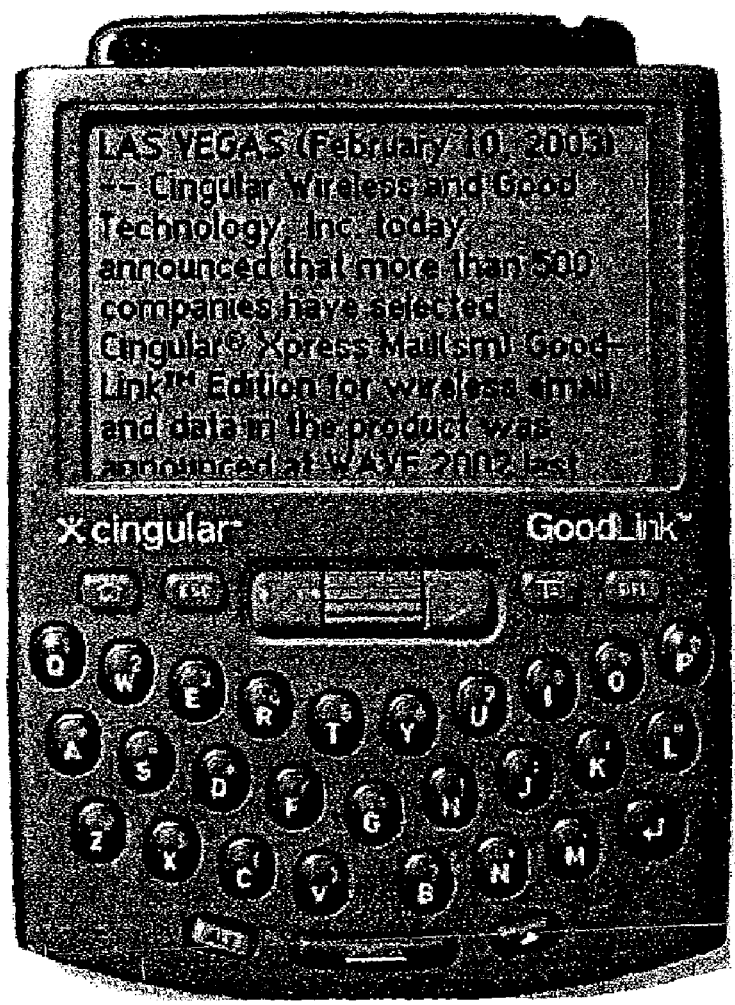
FIG. 3 illustrates an embodiment of a data processing apparatus with font magnification.
Figure 4:
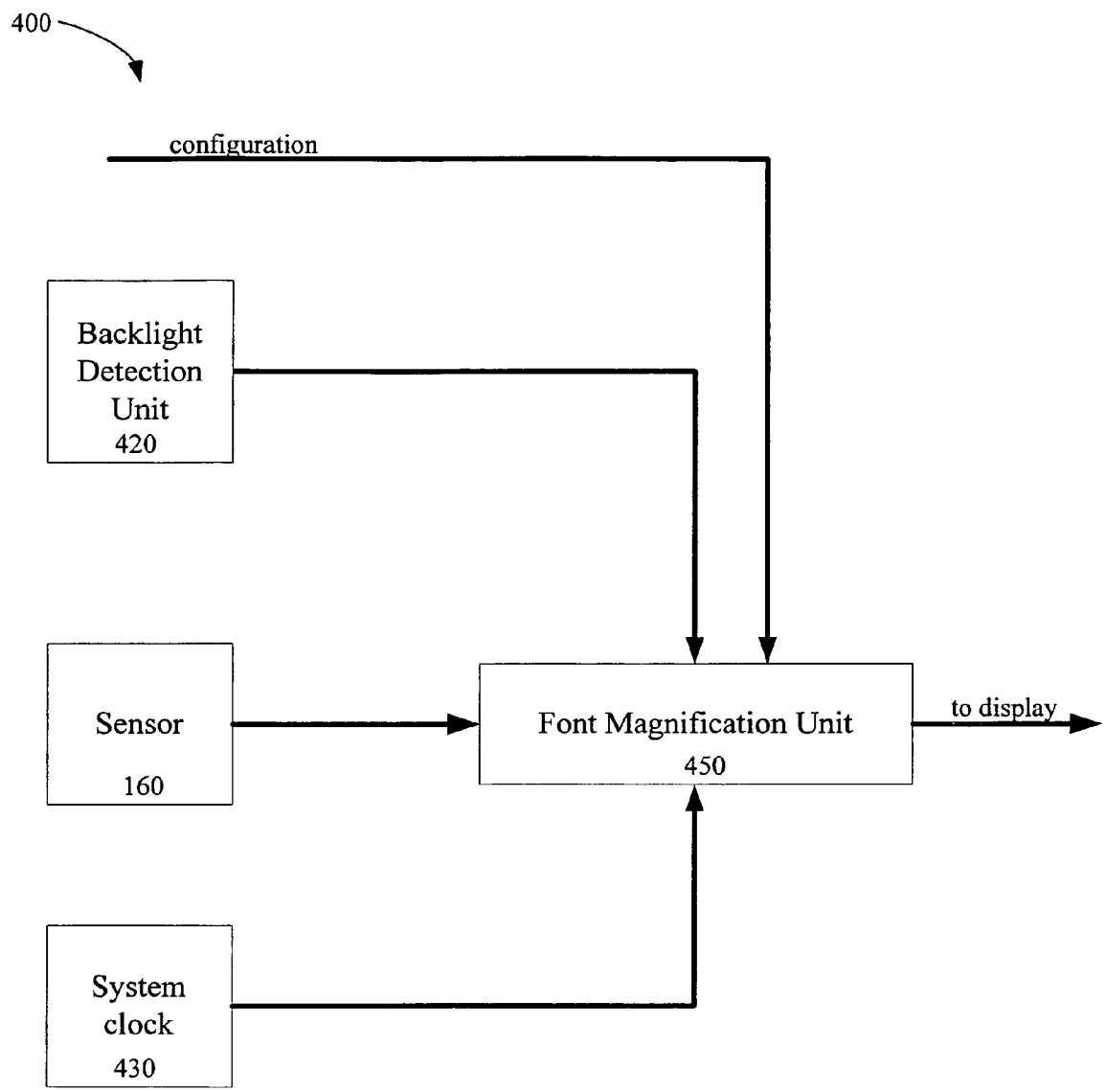
FIG. 4 is a block diagram of one embodiment of a font magnification mechanism.

According to one embodiment, the current font is automatically magnified to a larger bolder font whenever dark or dim lighting conditions exist. FIG. 3 illustrates one embodiment of handheld data processing device 100 with magnified text. FIG. 4 is a block diagram of one embodiment of a font magnification mechanism 400.

Referring to FIG. 4, font magnification mechanism 400 includes light sensor 160, backlight detection unit 420 and system inputs to a font magnification unit 450. Font magnification unit 450 magnifies the font displayed at display 120 depending upon user configuration information supplied to font magnification unit 450. In other embodiments, font magnification unit 450 may implement other means to make display 120 more visible during low-light conditions. For instance, font magnification unit 450 may switch display 120 to a higher contrast mode (e.g., from color to black and white), or increase the contrast setting on display 120.

Backlight detection unit 420 detects whether the display 120 backlight has been activated. In one embodiment, font magnification unit 450 magnifies the font currently used to a larger, more readable, font whenever the backlight is illuminated. Consequently, font magnification unit 450 provides the larger font to display 120 for user access upon receiving a signal from backlight detection unit 420, indicating that the backlight has been activated. In a further embodiment, font magnification unit 450 switches the font back to the smaller font upon receiving a signal from backlight detection unit 420 indicating that the backlight has been deactivated.

According to another embodiment, font magnification unit 450 provides the larger font to display 120 upon receiving a signal from light sensor 160. In such an embodiment, light sensor 160 detects whether the ambient light condition in which device 100 is being operated is below a predetermined threshold. Font magnification unit 450 switches the font back to the smaller font upon receiving a signal from light sensor 160 indicating that the ambient light condition has risen above the predetermined threshold.

According to yet another embodiment, font magnification unit 450 provides the larger font to display 120 upon receiving a signal from system clock 430. Since device 100 includes system clock 430, font magnification unit 450 may adjust the font size based during a specific time range during a day. The user may configure the times at which the font is to be magnified.

In one embodiment, the device 100 user may also select a UI option that enables the user to select whether the font magnification is automatic or manual. In such an embodiment, the selection is transmitted to font magnification unit 450 as configuration data. In a further, embodiment, a device 100 user may be prompted when low light conditions are detected. In such an embodiment, the user may select whether to activate the font magnification.

In addition, font magnification may receive configuration data from a keyboard short cut, or a menu item displayed on display 120 indicating that the display font is to be manually magnified. In response, font magnification unit 450 magnifies the font.

The above-described invention enables device 100 users with marginal to poor vision to better distinguish text on a display in low light conditions when a backlight is illuminated.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A handheld device comprising:
   a housing;
   a display mounted within the housing; and
   a font magnification mechanism to automatically magnify a font being displayed on the display to a larger font whenever the handheld device is operating in dim lighting conditions, the font magnification mechanism including a backlight detection unit, to detect when a backlight for the display is illuminated.

2. The handheld device of claim 1 wherein the font magnification mechanism comprises a magnification unit that magnifies the font in response to receiving an input indicating dim lighting conditions.

3. The handheld device of claim 2 wherein the magnification unit magnifies the font upon receiving a signal from the backlight detection unit indicating that the backlight has been illuminated.

4. The handheld device of claim 1 further comprising a light sensor, coupled to the display, to detect light beams from outside the display traveling into the display.

5. The handheld device of claim 1 further comprising:
a keyboard mounted within the housing;
a thumbwheel mounted on the housing;
a first button mounted on the housing next to the left side of the thumbwheel; and
a second button mounted on the housing next to the right side of the thumbwheel.

6. The handheld device of claim 1 wherein the handheld device is a personal digital assistant (PDA).

7. The handheld device of claim 1 wherein the handheld device is a two-way pager.

8. The handheld device of claim 1 wherein the handheld device is a wireless electronic mail (e-mail), calendar and contact list device.

9. A handheld device comprising:
a housing;
a display mounted within the housing;
a light sensor coupled to the display; and
a font magnification mechanism to automatically magnify a font being displayed on the display to a larger font whenever the handheld device is operating in dim lighting conditions, the font magnification mechanism including a magnification unit to magnify the font upon receiving a signal from the light sensor indicating that light conditions are below a predetermined threshold.

10. A handheld device comprising:
a housing;
a display mounted within the housing; and
a font magnification mechanism to automatically magnify a font being displayed on the display to a larger font whenever the handheld device is operating in dim lighting conditions, the font magnification mechanism including a magnification unit to magnify the font based upon a time range indicated by a system clock.

11. A method comprising:
detecting at a handheld device that dim lighting conditions exist;
receiving a signal at a magnification unit within the handheld device indicating the dim lighting conditions;
the magnification unit magnifying a font being displayed on the display to a larger font in response to receiving the signal; and
transmitting the signal from a backlight detection unit to the magnification unit whenever a backlight for the display is illuminated.

12. The method of claim 11 further comprising transmitting the signal from a light sensor to the magnification unit whenever the sensor detects that light conditions are below a predetermined threshold.

13. The method of claim 11 further comprising transmitting the signal from a system clock to the magnification unit during a time range indicated by the system clock.

* * * * *